United States Patent
Possley et al.

(10) Patent No.: US 7,327,370 B2
(45) Date of Patent: *Feb. 5, 2008

(54) MEMORY CONTROLLER HUB INTERFACE

(75) Inventors: Brian D. Possley, Chandler, AZ (US); David M. Puffer, Tempe, AZ (US); Kurt B. Robinson, Newcastle, CA (US); Ray Askew, Hillsboro, OR (US); James S. Chapple, Chandler, AZ (US); Thomas E. Dever, II, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/174,662

(22) Filed: Jul. 6, 2005

(65) Prior Publication Data
US 2005/0243096 A1 Nov. 3, 2005

Related U.S. Application Data

(63) Continuation of application No. 09/644,967, filed on Aug. 23, 2000, now Pat. No. 7,116,331.

(51) Int. Cl.
*G06F 13/14* (2006.01)
*G06F 15/16* (2006.01)

(52) U.S. Cl. .............. 345/520; 345/502; 345/503; 345/519

(58) Field of Classification Search .......... 345/520, 345/502, 503, 519
See application file for complete search history.

(56) References Cited

U.S. PATENT DOCUMENTS 5,072,411 A 12/1991 Yamaki
5,793,996 A 8/1998 Childers et al.
5,941,968 A 8/1999 Mergard et al.
6,069,638 A 5/2000 Porterfield
6,097,402 A 8/2000 Case et al.
6,148,357 A 11/2000 Gulick et al.
6,208,273 B1 * 3/2001 Dye et al. .............. 341/51
6,275,240 B1 8/2001 Riffault
6,304,244 B1 10/2001 Hawkins et al.
6,374,317 B1 4/2002 Ajanovic et al.
6,462,745 B1 * 10/2002 Behrbaum et al. .......... 345/543

(Continued)

FOREIGN PATENT DOCUMENTS

EP 0 326 275 8/1989

(Continued)

OTHER PUBLICATIONS

U.S. Appl. No. 09/595,509 Office Action mailed Jul. 10, 2003.

(Continued)

*Primary Examiner*—Kee M. Tung
*Assistant Examiner*—Hau H Nguyen
(74) *Attorney, Agent, or Firm*—Philip A. Pedigo

(57) ABSTRACT

A memory controller hub includes a graphics subsystem adapted to perform graphics operations on data, and interface circuitry adapted selectively to couple the graphics subsystem to a local memory through electrical connectors and to couple the memory controller hub to a graphics controller through the electrical connectors.

12 Claims, 7 Drawing Sheets

U.S. PATENT DOCUMENTS

| | | |
|---|---|---|
| 6,477,623 B2 | 11/2002 | Jeddeloh |
| 6,480,200 B1 | 11/2002 | Fisher et al. |
| 6,496,193 B1 | 12/2002 | Surti et al. |
| 6,532,019 B1 | 3/2003 | Gulick et al. |
| 6,549,963 B1 * | 4/2003 | Sayles ................ 710/104 |

FOREIGN PATENT DOCUMENTS

| | | |
|---|---|---|
| EP | 0 766 177 | 4/1997 |
| EP | 0 902 355 | 3/1999 |
| TW | 436694 | 5/2001 |
| WO | WO 99/28893 | 6/1999 |
| WO | WO 99/34293 | 7/1999 |
| WO | WO 00/29934 | 5/2000 |

OTHER PUBLICATIONS

U.S. Appl. No. 09/595,509 Office Action mailed Jan. 31, 2003.
U.S. Appl. No. 09/676,844 Office Action mailed Oct. 22, 2003.
U.S. Appl. No. 09/676,844 Office Action mailed Jun. 11, 2003.
U.S. Appl. No. 09/676,844 Office Action mailed Mar. 20, 2003.

* cited by examiner

| Pin # | AGP Signals | LM Signals | AGP Signals | LM Signals |
|---|---|---|---|---|
| 1. | OVRCNT# | | 12V | |
| 2. | 5.0V | | TYPEDET# | |
| 3. | 5.0V | | Reserved | |
| 4. | USB+ | | USB | |
| 5. | GND | | GND | |
| 6. | | | | |
| 7. | CLK | | RST# | |
| 8. | REQ# | MD27 | GNT# | |
| 9. | VCC3.3 | | VCC3.3 | |
| 10. | ST0 | MD28 | ST1 | DQM3 |
| 11. | ST2 | MD29 | Reserved | |
| 12. | RBF# | MD30 | PIPE# | MD24 |
| 13. | GND | | GND | |
| 14. | Reserved | | WBF# | |
| 15. | SBA0 | MD31 | SBA1 | MD25 |
| 16. | VCC3.3 | | VCC3.3 | |
| 17. | SBA2 | DQM2 | SBA3 | MD26 |
| 18. | SB_STB | | SB_STB# | |
| 19. | GND | | GND | |
| 20. | SBA4 | MD23 | SBA5 | WE# |
| 21. | SBA6 | MD22 | SBA7 | FREQ_SEL |
| 22. | Reserved | | Reserved | |
| 23. | GND | | GND | |
| 24. | 3.3Vaux | | Reserved | |
| 25. | VCC3.3 | | VCC3.3 | |
| 26. | AD31 | MD21 | AD30 | TCLK0 |
| 27. | AD29 | MD20 | AD28 | TCLK1 |
| 28. | VCC3.3 | | VCC3.3 | |
| 29. | AD27 | MD19 | AD26 | CAS# |
| 30. | AD25 | MD18 | AD24 | |
| 31. | GND | | GND | |
| 32. | AD_STB1 | | AD_STB1# | |
| 33. | AD23 | MD17 | C/BE3# | RAS# |
| 34. | Vddq | | Vddq | |
| 35. | AD21 | MD16 | AD22 | MA0 |
| 36. | AD19 | MD15 | AD20 | MA9 |
| 37. | GND | | GND | |
| 38. | AD17 | MD14 | AD18 | BA/MA11 |
| 39. | C/BE2# | MD13 | AD16 | MA8 |
| 40. | Vddq | | Vddq | |

FIG. 5a

| Pin# | AGP Signals | LM Signals | AGP Signals | LM Signals |
|---|---|---|---|---|
| 40. | Vddq | | Vddq | |
| 41. | IRDY# | MD12 | FRAME# | MA10 |
| 42. | 3.3Vaux | | Reserved | |
| 43. | GND | | GND | |
| 44. | Reserved | | ReserveD | |
| 45. | VCC3.3 | | VCC3.3 | |
| 46. | DEVSEL# | MD11 | TRDY# | MA7 |
| 47. | Vddq | | STOP# | CS# |
| 48. | | | PME# | |
| 49. | GND | | GND | |
| 50. | | | PAR | MA6 |
| 51. | C/BE1# | MD10 | AD15 | MA1 |
| 52. | Vddq | | Vddq | |
| 53. | AD14 | MD9 | AD13 | MA5 |
| 54. | AD12 | MD8 | AD11 | MA2 |
| 55. | GND | | GND | |
| 56. | AD10 | DQM1 | AD9 | MA4 |
| 57. | AD8 | MD0 | C/BE0# | MA3 |
| 58. | Vddq | | Vddq | |
| 59. | AD_STB0 | | AD_STB0# | |
| 60. | AD7 | MD1 | AD6 | MD5 |
| 61. | GND | | GND | |
| 62. | AD5 | MD2 | AD4 | MD6 |
| 63. | AD3 | MD3 | AD2 | MD7 |
| 64. | Vddq | | Vddq | |
| 65. | AD1 | MD4 | AD0 | DQM0 |
| 66. | Vrefcg | | Vrefgc | |

FIG. 5b

MEMORY CONTROLLER HUB INTERFACE

CROSS-REFERENCE TO RELATED APPLICATIONS

This application is a continuation application of and claims priority from U.S. application Ser. No. 09/644,967, filed on Aug. 23, 2000, now U.S. Pat. No. 7,116,331.

BACKGROUND

The invention relates to memory controller hub interfaces.

Microcomputer systems generally include one or more memory controllers that control and coordinate the transfer of data between the computer's system memory, central processing unit (CPU), and peripheral devices. Graphics applications may be supported by peripheral devices known as graphics controllers that require a memory controller hub to transfer data between them, the system memory, and the CPU.

A design concern associated with microcomputer systems is the quality of two-dimensional (2D), three-dimensional (3D), and video image (often collectively referred to below as "graphics") processing. High-performance graphics processing requires processor-intensive calculations and the fast manipulation of large quantities of data. Several designs have been implemented to achieve high-performance graphics processing while also reducing the cost of the complete system and allowing for upgrades to the computer system's capability.

A computer system may include a graphics controller coupled to local memory for storing graphics data, so that the amount of data that must be transferred between the graphics controller and the system memory and/or the CPU is reduced. Increasing the amount of local memory available to the graphics controller improves graphics performance, but also increases the cost of the computer system, because local graphics memory is relatively expensive. Less local memory is required to achieve the same graphics performance, however, if a dedicated bus, e.g., an Accelerated Graphics Port (AGP), is used to couple the controller to the memory controller. An AGP allows the controller to treat portions of system memory as dedicated local graphics memory, which reduces the amount of local memory required and lowers overall system costs.

Computer system costs also may be reduced by eliminating the peripheral graphics controller and integrating its functionality into the memory controller. In such a configuration the memory controller hub is better described as a graphics/memory controller, since it performs graphics processing functions in addition to memory control and transfer functions. Additionally, it includes one or more output ports to send graphics signals to external devices, such as cathode ray tubes (CRTs) and flat-panel monitors. A graphics/memory controller hub may be coupled to local memory for storing graphics data.

BRIEF DESCRIPTION OF DRAWINGS

FIGS. 5a and 5b are a table of signals used to communicate across a shared AGP/local memory interface.

DETAILED DESCRIPTION

In a computer system, a memory controller hub may be integrated with an internal graphics controller and may interface with an external graphics device through an AGP port. Because the memory controller hub controls both graphics and memory functions it is referred to as a graphics/memory controller hub (GMCH). The GMCH provides both internal graphics processing and scalable graphics performance through an AGP interface.

The GMCH may be used in one of two mutually exclusive modes: AGP mode, in which case the GMCH uses its capability to interface with an external graphics controller and its internal graphics functionality is disabled; or Gfx mode, in which case the GMCH uses its internal graphics capability, and its ability to interface with an external graphics controller is disabled. In Gfx mode the GMCH can still interface with a local memory module through the AGP port to provide additional graphics memory for use by the internal graphics. Whether the GMCH operates in AGP mode or Gfx mode can be determined automatically and set during the start-up sequence of the computer.

Figure 1:
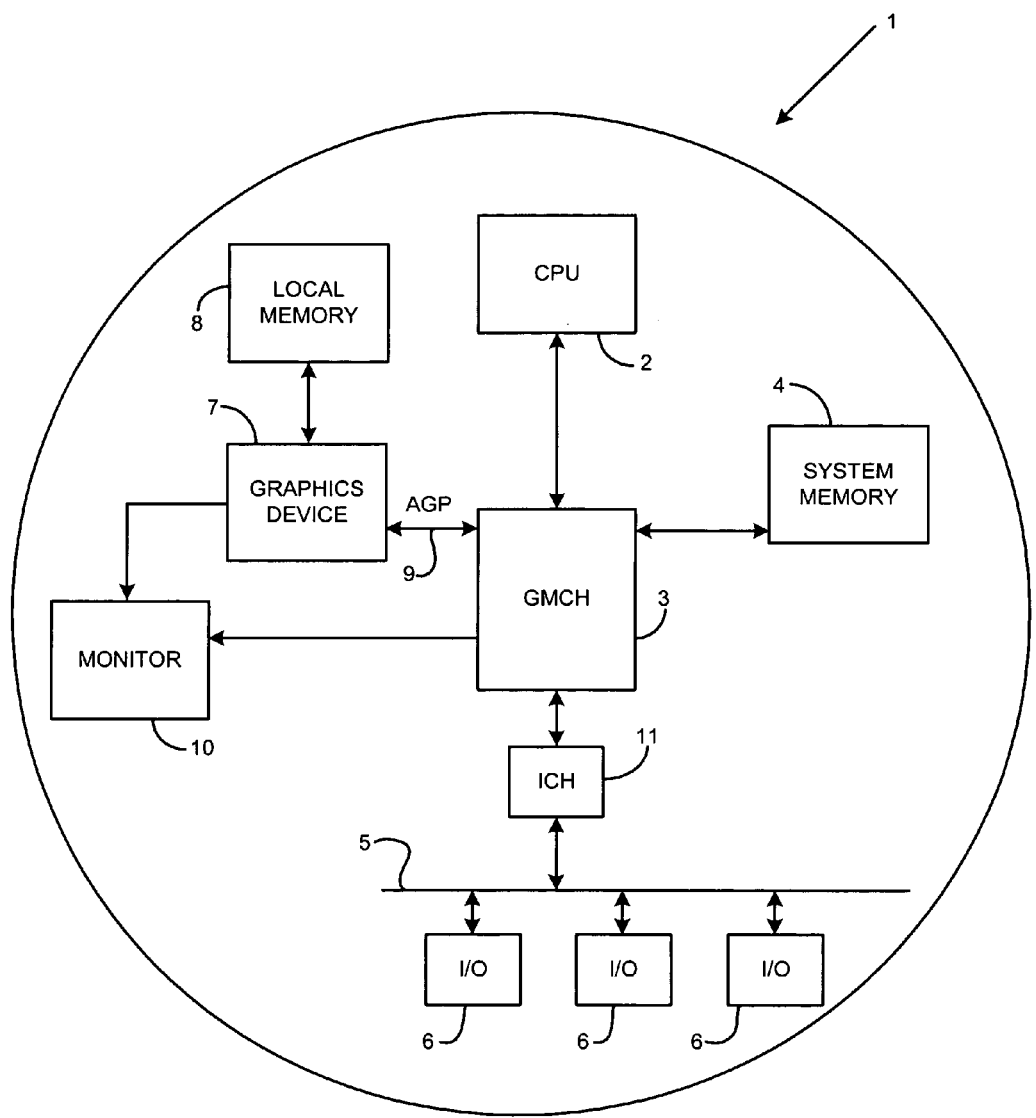
FIG. 1 is a schematic block diagram of a computer system.

FIG. 1 illustrates an exemplary computer system 1 in which the GMCH can be implemented. The computer system 1 includes a microprocessor (for example, a central processing unit, or "CPU") 2 coupled to a GMCH 3, which contains a system memory controller. GMCH 3 may also be referred to as a "chipset" or "core logic." GMCH 3 provides an interface between CPU 2 and system memory 4, and between CPU 2 and a bus, for example, a peripheral component interconnect (PCI) or Hublink™ bus 5. Various input/output (I/O) devices 6 are coupled to PCI bus 5, which is coupled to GMCH 3 via input/output controller hub (ICH) 11. Computer system 1 may also include a graphics device 7, which may be a graphics controller coupled to local memory 8, or which may be an AGP Inline Memory Module (AIMM) that provides external local memory for the internal graphics functionality of GMCH 3. A shared AGP/local memory interface 9 provides a dedicated interface bus between GMCH 3 and graphics device 7. Graphics and video signals may be sent to a display device 10 from graphics device 7 if one is present in the computer system, or may be sent to display device 10 from GMCH 3 if graphics device 7 is absent.

Figure 2:
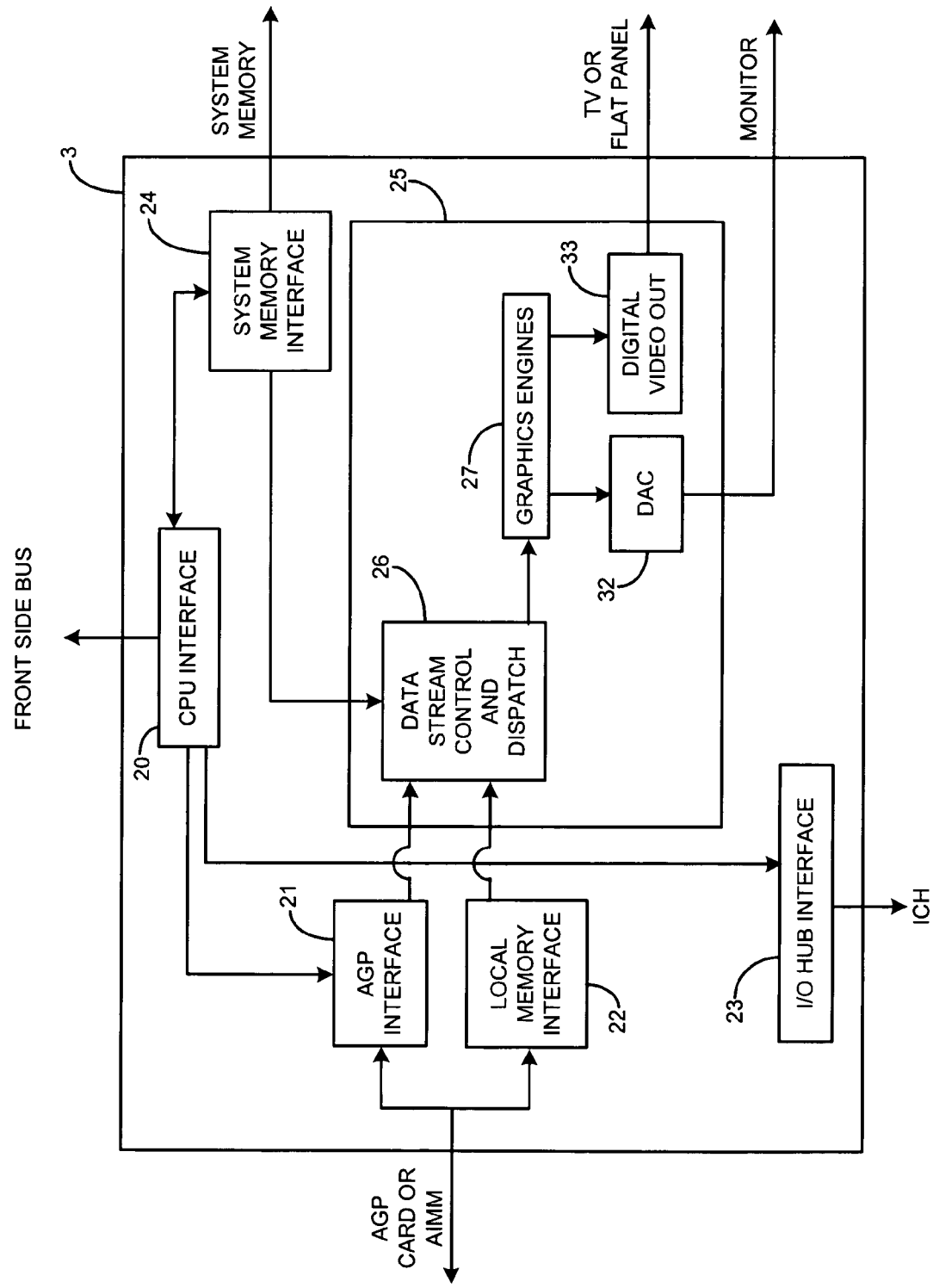
FIG. 2 is a schematic block diagram of a graphics memory controller hub.

FIG. 2 illustrates other details of GMCH 3, including a CPU interface 20 coupled to an AGP interface 21, a local memory interface 22, an input/output (I/O) hub interface 23, and a system memory interface 24. Graphics functions can be performed by internal graphics components 25, which include a data stream and dispatch controller 26 to manage the flow of data and various graphics engines 27 to perform graphics operations on data.

In one embodiment, AGP interface 21 and local memory interface 22 enable GMCH 3 to be coupled, via a shared dedicated bus interface, to external graphics device 7. AGP interface 21 couples GMCH 3 to an external graphics controller (not shown) and local memory interface 22 couples GMCH 3 to an AIMM card that holds SDRAM physical memory (not shown) for use with internal graphics components 25. AGP interface 21 and local memory interface 22 share a physical interface, but communication protocols and signals across the interface depend on whether it is used to couple data stream and dispatch controller 26 to an AGP graphics controller or to an AIMM card. The same component pins are used for both interfaces. The shared interface reduces the number of pins on GMCH 3 that would be required to support two independent interfaces, thus reducing the size and cost of GMCH 3. Furthermore, the reduced number of pins on the shared interface facilitates routing the design of the motherboard into which GMCH 3 and local graphics memory are plugged in four layers. This reduces the GMCH cost and the board cost. As a result of the shared interface, almost all local memory interface signals can be mapped onto AGP interface 21. When GMCH 3 is configured in AGP mode, the shared interface supports the AGP interface 21. When GMCH 3 is configured in Gfx mode, the interface serves as a local memory interface 22, but local memory is optional and SDRAM devices need not be connected to interface 22.

Figure 3:
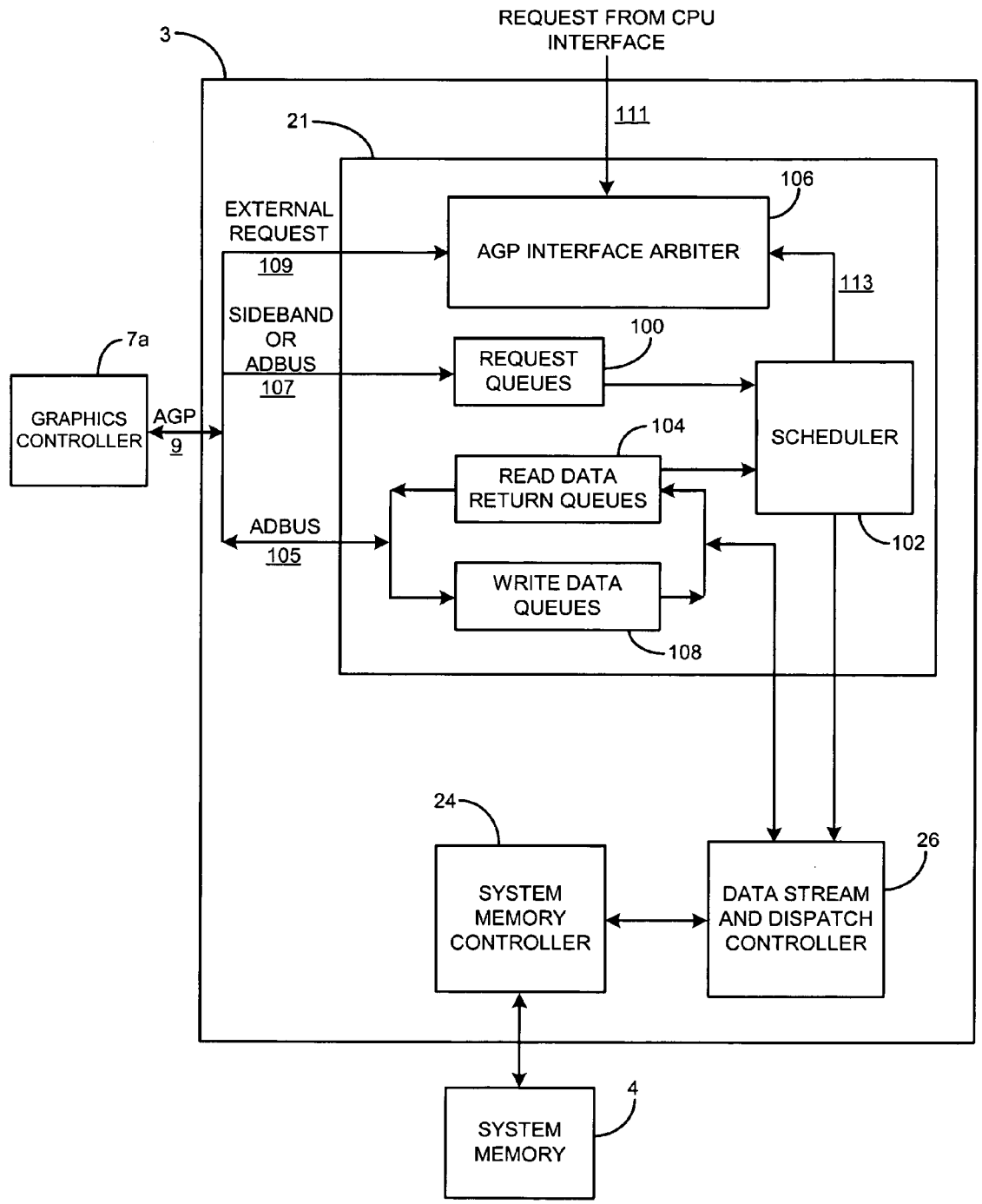
FIG. 3 is a schematic block diagram of an accelerated graphics port (AGP) interface of a graphics memory controller hub.

FIG. 3 is a schematic block diagram illustrating the AGP functionality of GMCH 3. AGP interface 21 of GMCH 3 provides a dedicated bus to transfer data and memory access requests between an external graphics controller 7a and system memory 4. The AGP bus provides sufficient bandwidth for a graphics controller in a computer system to run complex 3D graphics and full-motion video applications, for example, games and architectural and engineering simulations. The AGP is described in detail in the Accelerated Graphics Port Interface Specification, Revision 2.0, published by Intel Corporation, Santa Clara, Calif. (hereinafter the "AGP Specification"). PCI compliant devices, in addition to AGP compliant devices, may communicate across AGP interface 21.

AGP transactions are run in a split transaction fashion where the request for data transfer is disconnected in time from the data transfer itself. An AGP compliant graphics device (bus master) 7a initiates a transaction with an access request. The AGP interface 21 responds to the request by directing the corresponding data transfer at a later time, which permits the AGP graphics device 7a to pipeline several access requests while waiting for data transfers to occur. As a result of pipelining, several read and/or write access requests may be simultaneously outstanding in request queues 100. Access requests can either be pipelined across an address/data bus (AD bus) 105, 107 of AGP or transferred through sideband address lines 107 of AGP 9 and received by request queue 100.

Scheduler 102 processes the access requests in request queue 100. Read data are obtained from system memory 4 and are returned at the initiative of scheduler 102 via read data return queue 104 and across AD bus 105 of the 9. Write data are provided by AGP compliant graphics controller 7 at the direction of scheduler 102 when space is available in the write data queue 108. Thus, AGP transactions generally include interleaved access requests and data transfers.

GMCH 3 uses a distributed arbitration model to integrate the functions of AGP compliant graphics controller 7a with other components connected to GMCH. Independent buses and interfaces (i.e., CPU interface 20, AGP interface 21, local memory interface 22, hub interface 23, and system memory interface 24) and distributed arbitration allow multiple transactions to be issued simultaneously. As long as transactions on the independently arbitrated buses do not compete for the common resources, they can proceed in parallel. The arbitration algorithms and policies fulfill particular agent requirements and may favor different aspects of system performance, for example, low bus/resource acquisition latency, optimized instantaneous peak bandwidth, or optimized sustained bandwidth.

AGP interface arbiter 106 detects external request signals 109, internal request signals 111 from CPU interface 20, and data queue status signals 113 from scheduler 102. Along with determining whether the AGP master 7a or GMCH 3 owns the physical interface, arbiter 106 dictates to the external graphics device 7a (the AGP master) the type of transactions that can be carried out during its ownership of the interface signals. The arbitration handshake and the function of AGP signals are described in detail in the AGP specification. Write data status inputs sent from scheduler 102 to arbiter 106 result from write access requests when space in write buffers 108 is available. Read data status inputs sent from scheduler 102 to arbiter 106 result from data being read from memory and made available in read queue 104 to be returned over AD bus 105.

Because the decisions of arbiter 106 depend on the state of the read buffers 104 and write buffers 108, the arbiter functions in conjunction with scheduler 102. Scheduler 102 dispatches AGP non-snoopable requests internally to system memory interface 4 and identifies to AGP interface arbiter 106 the priority in which it should service pending requests and accept new requests. Scheduler 102 enforces compliance with AGP ordering rules and, along with system memory arbitration logic (not shown), allows high priority requests to be handled as highest priority events in the system.

Figure 4:
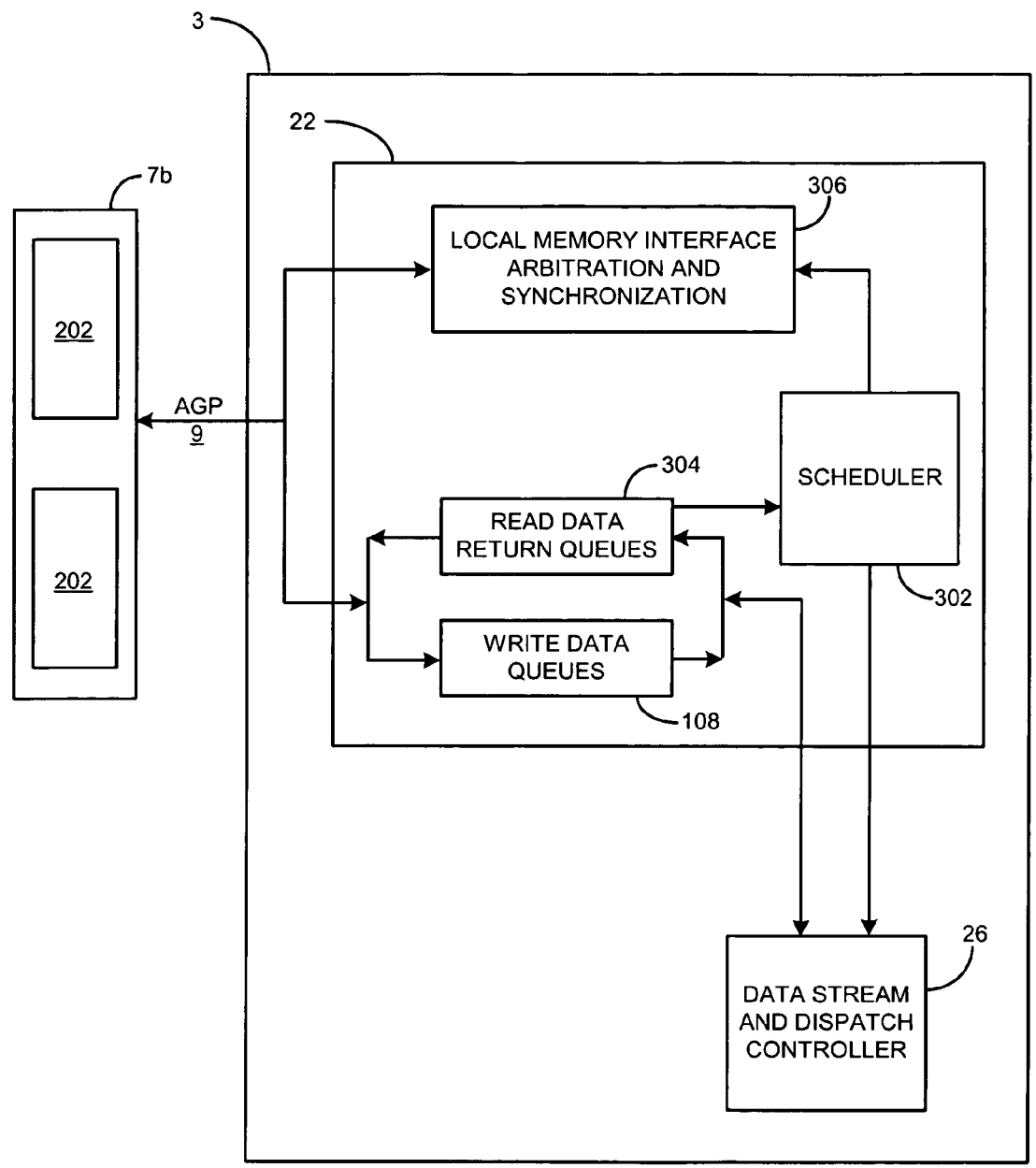
FIG. 4 is a schematic block diagram of a local memory interface of a graphics memory controller hub.

Referring to FIG. 4, local memory interface 22 of GMCH 3 provides a dedicated 32-bit wide SDRAM channel to transfer graphics data between internal graphics components 25 of GMCH 3 and local graphics memory 202 stored on AIMM card 7b. Local memory interface 22 also manages the control and timing of such transfers. Local memory interface 22 is de-coupled from the internal graphics core 25 and can be enabled, for example, with frequencies of 100 megahertz (MHz) and 133 MHz, which may be independent of the graphics core.

Local memory 202 can exist on an AIMM card 7b card that complies with the AGP form-factor. AIMM card 7b is a four layer printed circuit board, which fits into a 3.3 Volt or universal AGP connector on the motherboard of the computer system, but instead of providing AGP/PCI functionality, the card contains graphics memory, for example, one 2M×32 SDRAM device or two 1M×16 SDRAM devices 202 (FIG. 4).

Since the local memory interface supports both 100 MHz and 133 MHz frequencies, a strap can be used to determine which frequency to select. When AIMM card 7b is plugged into the AGP slot on the motherboard it communicates to GMCH 3 its appropriate operating frequency on one of the pins of local memory interface 22. GMCH 3 samples the pin during reset, but the value on this pin may also be overridden by software via the GMCH configuration register. Since current SDRAM technology uses 3.3 volt (V) logic rather than the 1.5 V option supported by AGP, AIMM card 7b sets a signal on a pin of local memory interface 22 to indicate that it requires 3.3 V power. Furthermore, AIMM card 7b should only present a 3.3 V key to local memory interface 22 and not a 1.5 V key, to prevent it from being inserted into a 1.5 V-only connector.

The read queues 304 and write queues 308 in local memory interface 22 function similarly to the read/write queues for AGP interface 21. However, queues 304, 308 are modified slightly to handle additional local memory datapaths. Data are written from AIMM card 7b to read data queue 304, and to AIMM card 7b from write data queue 308 within local memory interface 22 over the AGP. Scheduler 302 and local memory arbiter 306 function together to control the flow of data across local memory interface 22.

In Gfx mode, the signal used on the particular pin of local memory interface 22 to indicate whether or not GMCH is operating in AGP mode should remain functional as a reference voltage for sampling 3.3V local memory data (LMD) inputs. The voltage level on the pin is identical to the level used in AGP mode.

Pin mapping assignments for signals used on AGP interface 21 and local memory interface 22 can be made with the primary goal of optimizing the layout of AIMM card 7b. AGP signals as they exist on the standard AGP connector serve as a basis for the pin mapping, but special types of AGP signals such as strobes and any open-drain signals can be omitted. Also, some signals that exist on the standard AGP connector do not exist on GMCH's AGP interface 21, so these are not be used for local memory (LM) signals. The pin mapping assignments for AGP signals and LM signals are listed in the table shown in FIGS. 5a and 5b.

AGP addressing signals include PIPE# and SBA signals. PIPE# is a sustained tri-state signal from the master (i.e., the graphics controller) to GMCH 3, which triggers a pipeline read. PIPE# is asserted by the current master to indicate that a full width address is to be queued by the target. The master queues one request per rising clock edge while PIPE# is asserted. When PIPE# is deasserted no new requests are queued across the AD bus. SBA signals are sideband address signals sent across sideband bus 107 and are used to pass address and command signals from the AGP master to GMCH 3.

Pipeline reads and sideband addressing are two mutually exclusive mechanisms used to queue requests from the AGP master. When PIPE# is used to queue addresses, the master is not allowed to queue addresses using sideband bus 107. During configuration time, if the master indicates that it can use either mechanism, the configuration software will indicate which mechanism the master will use. The master will use the selected mechanism until it is reset and reprogrammed to use the other mode. A change of modes does not occur dynamically, but only when the device is first configured after being reset.

AGP flow control signals include RBF#, WBF#, and ST signals. RBF# (the read buffer full signal) indicates if the master is ready to accept previously requested low priority read data. RBF# is sampled only at the beginning of a cycle, and when it is asserted GMCH 3 is not allowed to return low priority read data to the AGP master on the first block. WBF# (the write buffer full signal) indicates if the master is ready to accept fast write data from GMCH 3. WBF# is sampled only at the beginning of a cycle, and when it is asserted, GMCH 3 is not allowed to drive fast write data to the AGP master. ST signals provide status information from arbiter 106 to the AGP master. ST signals can be used to indicate that previously requested low or high priority read data are being returned to the master, that the master is to provide low or high priority write data for a previously queue write command, or that the master has been given permission to start a bus transaction. ST signals are always an output from GMCH 3 and an input to the AGP master.

AGP frame# (PCI) signals, including FRAME#, IRDY#, TRDY#, STOP#, DEVSEL#, REQ#, GNT#, AD, C/BE, and PAR signals, are based on PCI signals defined in PCI Component Specification 2.1, but are redefined when used to carry out AGP transactions.

FRAME# is asserted by GMCH 3 during fast writes to indicate the beginning and duration of a data transfer transaction. REQ# is used to request access to the bus to initiate a PCI or AGP request. For fast write transactions, IRDY# is driven by GMCH 3 to indicate that the AGP master is ready to provide all write data for the current transaction. Once IRDY# is asserted for a write operations, the master is not allowed to insert wait states. The assertion of IRDY# for reads indicates that the master is ready to transfer write data. The master may insert wait states between transfers of 32 byte data blocks, but not during a transfer. GMCH 3 deasserts IRDY# to insert wait states between data blocks. TRDY# is used by the AGP master during fast write transactions to indicate if and when the AGP master is capable of transferring a subsequent block of read data. The target is allowed to insert wait states between 32 byte data block transfers if multiple blocks are to be sent.

STOP# is used to indicate a signal disconnect or target abort termination. DEVSEL# is used to indicate that the transaction cannot complete during the block transfer. REQ# is input to AGP interface arbiter 106 to request access to the AGP bus in order to initiate an AGP or PCI transaction. GNT# is asserted if read data are pending in the read data return queue 104 or if a write command is received and space is available is the write data queue 108. GNT# is deasserted when there are no active inputs to AGP interface arbiter 106. AD signals are address and data signals sent across AD bus 105, 107 and are used to pass address and command signals from the AGP master to GMCH 3. C/BE (command/byte enable) signals provide command information when requests are being queued during pipelined transfers, and provide byte information during AGP write transactions. C/BE signals are not used during the return of read data. PAR is a parity signal used for PCI transactions, but not for AGP transactions, carried out over the AGP bus.

AGP clocking and miscellaneous signals include AD_STB, SB_STB, TYPEDET#, RST#, PME#, and USB signals. AD_STB (AD bus strobe) provides timing for 2× and 4× clocked data transferred as AD signals and C/BE signals on the AD bus 105. SB_STB (sideband strobe) provides timing for 2× and 4× clocked data transferred as SBA signals on SB bus 107. TYPEDET# is used to indicate what kind of logic signal shall be used with an AIMM card 7b if one is plugged into the AGP interface. Since current SDRAM technology is always 3.3V rather than the 1.5V option also supported by AGP, the AIMM card should set the TYPEDET# signal correctly (open indicates 3.3 V; grounded indicates 1.5 V) to indicate it requires a 3.3V power supply (not grounded). Furthermore, the AIMM card should have only the 3.3V key and not the 1.5V key, preventing it from being inserted into 1.5V-only connector. RST# is received from ICH 11 and is used to reset AGP interface logic within the MCH. PME# (power management event) is used to wake up the device from a suspended state. USB signals are universal serial bus signals.

Local memory signals mapped onto APG signals include MA, MD, DQM, CS#, RAS#, CAS#, WE#, FREQ_SEL, and TCLK. Local memory signals use the same pins of the physical interface as AGP signals do, as shown in FIG. 5. MA (memory address) signals provide the multiplexed row and column addresses from GMCH 3 to the local memory 202. MD (memory data) signals are used to interface with the local memory data bus. DQM signals control the memory array and act as synchronized output enables during read cycles and as byte enables during write cycles. CS# (chipset select) signal selects the local memory SDRAM components when asserted and indicates when a valid SDRAM command is present. RAS# and CAS# are row address strobe and column address strobe signals, respectively. WE# (write enable) signal is asserted during writes to local memory 202. FREQ_SEL indicates whether local memory 202 is to run at 100 MHz or 133 MHz. TCLK is the clock signal sent to local memory 202.

The physical interface shared by local memory interface 22 and AGP interface simplifies the fabrication and operation of GMCH 3, yet offers flexible functionality to the user of GMCH 3.

Figure 6:
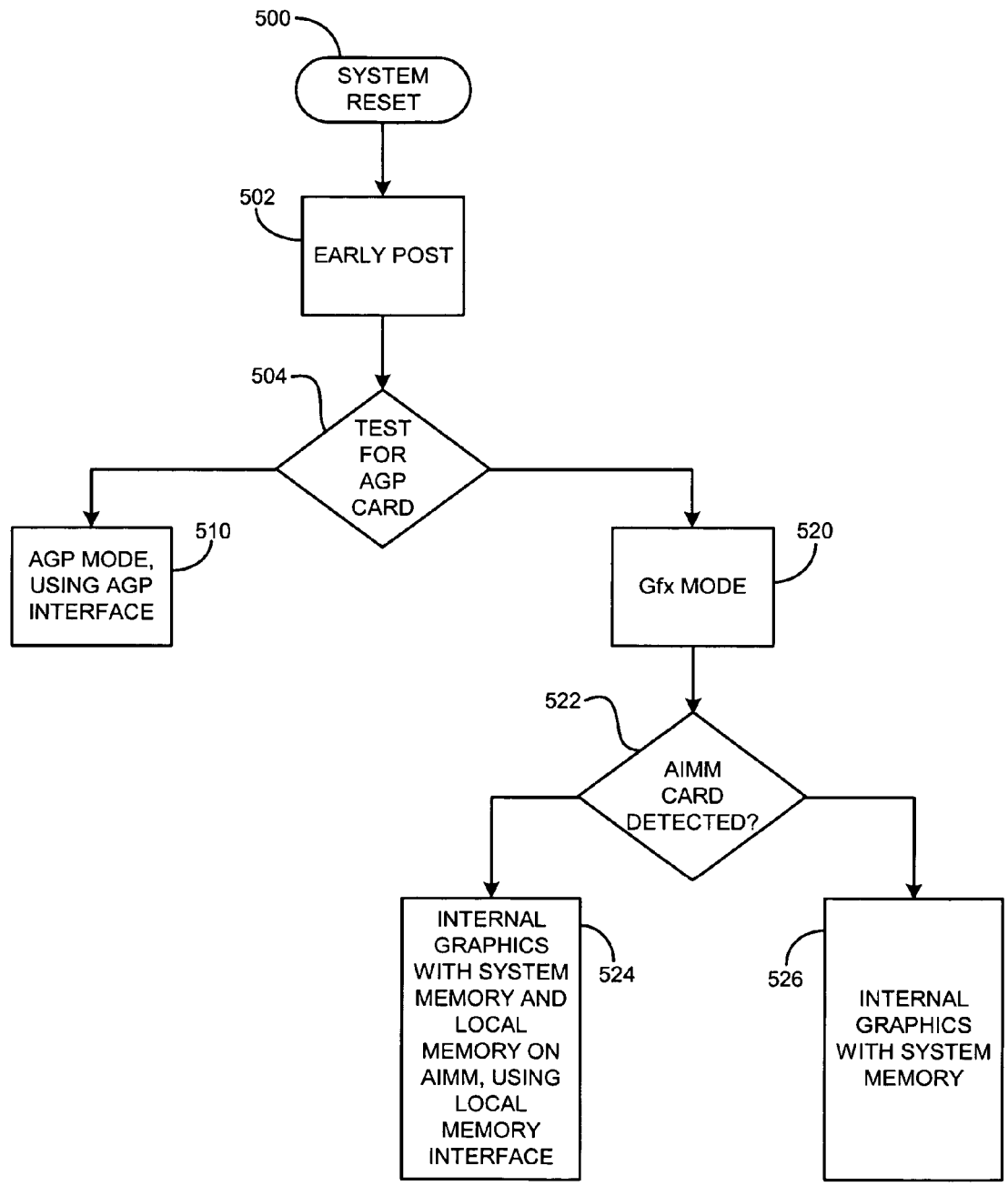
FIG. 6 is a flow chart of a method of selecting either an AGP interface or a local memory interface for use by a memory controller.

Referring to FIG. 6, when the computer system is reset, it automatically detects whether an external graphics controller or an AIMM card is plugged into shared AGP/local memory interface and initializes the computer in the appropriate graphics mode.

The computer system 1 can be reset 500 when it is powered up, reset by the user, or automatically reset by the computer system. During early Power On Self Test (POST) 502 the system basic input output system (BIOS) performs various tests of the computer system hardware and software including detecting system memory and basic initialization of hardware and software. During the POST, the BIOS tests if an AGP graphics controller is plugged into the AGP slot 504 by executing a configuration read to the PCI bus.

If an AGP compatible controller is present, it is detected by the system BIOS and serves as the graphics controller for the computer system. The computer system is initialized in AGP mode 510, and an AGP/Gfx select bit is set to 0 in a configuration register to track this fact for the system. GMCH 3 is initialized to use AGP interface 21 to communicate with the AGP compatible controller.

If an AGP compatible controller is not located, the computer system is initialized to operate in Gfx mode 520 to use internal graphics, and AGP/Gfx select bit is set to 1. After Gfx mode is selected, the BIOS tests 522 for the presence of an AIMM card. If an AIMM card is not present, the computer system is initialized to use internal graphics functionality with system memory 526. If an AIMM card is detected, then the computer system is initialized to use internal graphics functionality with system memory and local memory on the AIMM card, and GMCH 3 is initialized to use local memory interface 22 to communicate with the AIMM card 524.

Other implementations are within the scope of the claims.

What is claimed is:

1. A computer chip comprising:
an internal graphics subsystem adapted to perform graphics operations on data; and interface circuitry adapted selectively to couple the internal graphics subsystem to a local memory through electrical connectors and to couple the computer chip to an external graphics controller through the same electrical connectors, wherein the local memory is to provide graphics memory for use by the internal graphics subsystem.

2. The computer chip of claim 1 wherein the interface circuitry comprises a cache interface for coupling the graphics subsystem to a local memory and a controller interface for coupling the computer chip to a graphics controller.

3. The computer chip of claim 2 wherein the controller interface is adapted to couple the computer chip to the graphics controller though an accelerated graphics port (AGP).

4. The computer chip of claim 2 wherein the local memory includes an AGP inline memory module.

5. The computer chip of claim 2 wherein the cache interface is adapted to couple the graphics subsystem to the local memory though an accelerated graphics port (AGP).

6. The computer chip of claim 1 wherein the electrical connectors are adapted for use by the interface circuitry to transfer signals between the graphics subsystem and a local memory and for use by the interface circuitry to transfer signals between the computer chip and a graphics controller.

7. A computer system comprising:
a CPU;
a display device;
a system memory, the system memory adapted to store video data and non-video data; and
a computer chip coupled to the CPU and coupled to the system memory, the computer chip comprising:
an internal graphics subsystem adapted to perform graphics operations on graphics data; and
interface circuitry adapted selectively to couple the internal graphics subsystem to a local memory through electrical connectors and to couple the computer chip to an external graphics controller through the same electrical connectors, wherein the local memory is to provide graphics memory for use by the internal graphics subsystem.

8. The computer system of claim 7 wherein the interface circuitry comprises a cache interface for coupling the graphics subsystem to a local memory through electrical connectors and a controller interface for coupling the computer chip to a graphics controller through the electrical connectors.

9. The computer system of claim 7 wherein the electrical connectors are adapted for use by the cache interface to transfer signals between the graphics subsystem and a local memory and for use by the controller interface to transfer signals between the computer chip and a graphics controller.

10. The computer system of claim 7 wherein the controller interface is adapted to couple the computer chip to a graphics controller though an accelerated graphics port (AGP).

11. The computer system of claim 7 wherein the local memory includes an AGP inline memory module.

12. The computer system of claim 7 wherein the cache interface is adapted to couple the internal graphics subsystem to a local memory though an accelerated graphics port (AGP).

* * * * *